United States Patent [19]

Yokoyama et al.

[11] Patent Number: 5,450,292
[45] Date of Patent: Sep. 12, 1995

[54] SURFACE LIGHT SOURCE DEVICE

[75] Inventors: Kazuaki Yokoyama, Saitama; Tsuyoshi Ishikawa, Tokyo, both of Japan

[73] Assignee: Enplas Corporation, Kawaguchi, Japan

[21] Appl. No.: 31,309

[22] Filed: Mar. 15, 1993

[30] Foreign Application Priority Data

| Mar. 16, 1992 | [JP] | Japan | 4-022200 U |
| Mar. 16, 1992 | [JP] | Japan | 4-022206 U |
| Mar. 18, 1992 | [JP] | Japan | 4-022905 U |
| Jul. 23, 1992 | [JP] | Japan | 4-062766 U |
| Aug. 31, 1992 | [JP] | Japan | 4-070992 U |

[51] Int. Cl.⁶ ............................ G02F 1/1335
[52] U.S. Cl. ......................... 362/31; 362/26; 362/216
[58] Field of Search ............ 362/31, 26, 216, 290, 362/330

[56] References Cited

U.S. PATENT DOCUMENTS

| 4,059,916 | 11/1977 | Tachihara et al. | 362/31 |
| 4,842,378 | 6/1989 | Fasck et al. | 362/31 |
| 4,974,122 | 11/1990 | Shaw | 362/31 |
| 5,040,098 | 8/1991 | Tanaka et al. | 362/26 |
| 5,130,898 | 7/1992 | Akahane | 362/31 |
| 5,178,447 | 1/1993 | Murase et al. | 362/26 |

FOREIGN PATENT DOCUMENTS

| 309918 | 12/1988 | Japan . |
| 52314 | 2/1990 | Japan . |
| 9304 | 1/1991 | Japan . |
| 111819 | 5/1991 | Japan . |
| 0190004 | 8/1991 | Japan ............................ 362/290 |
| 10823 | 9/1990 | WIPO . |

*Primary Examiner*—Ira S. Lazarus
*Assistant Examiner*—Sara Raab
*Attorney, Agent, or Firm*—Cushman, Darby & Cushman

[57] ABSTRACT

A surface light source device having light sources provided along all four side edges of a light-conducting member. A light guide has a diffusion plate on its front surface and a reflection surface on its back surface. The back surface of the light-conducting member has a pattern consisting of tiny rough surface areas. The pattern is so formed that in a direction of connecting a pair of two opposed sides of the light-conducting member, the density of the rough surface areas is the largest in the center portion, but gradually decreases toward the two opposed side edges and reaches the smallest density on the two opposed side edges. Thus, the surface light source device increases the brightness and provides a uniform distribution of brightness.

19 Claims, 8 Drawing Sheets

SURFACE LIGHT SOURCE DEVICE

BACKGROUND OF THE INVENTION a) Field of the Invention

This invention relates to a surface light source device having a light-conducting member.

b) Description of the Prior Art

A conventional surface light source device with a light-conducting member 1 is shown in FIG. 1. The conventional device includes a light-conducting member consisting of transparent sheet material with a specific thickness and having a rectangular shape as seen from the top in the drawing, one or two linear light sources 2, such as cold-cathode tubes, mounted close to either a single or both ends 1a of the light-conducting member 1, a diffusion plate 3 disposed along the front surface (a light emitting side) 1b of the light-conducting member 1, and a reflection surface 4 disposed along the back surface 1c (an opposite side to the light emitting side 1b of the light-conducting member 1). Further, the back surface 1c of the light-conducting member 1 may have a multiplicity of tiny rough surface areas, each containing a multiplicity of dots 5a, as shown in FIG. 2. Also, the surface 1c may have a multiplicity of dots 5a, as shown in FIG. 3. FIGS. 2 and 3 each show a left half portion of the back surface 1c of the light-conducting member 1 as viewed from below in FIG. 1.

In such a surface light source device wherein a pair of light sources are provided as shown in FIG. 1, light emerging from a pair of the light sources 2 enters adjacent end surfaces 1a, 1a, undergoes total internal reflection and is transmitted through the light-conducting member 1 toward the center, respectively. As the light passes through the light-conducting member 1 by total internal reflection, the light is diffused by dots 5a, as shown in FIGS. 2 and 3. Part of the light is emitted from the surface 1b of the light-conducting member 1. The light passes through the diffusion plate 3 to form diffuse light. To provide a uniform distribution of light in the diffusion plate 3 after passing through the plate 3, the surface 1c of the light-conducting member 1 has an appropriate pattern of the tiny rough surface areas 5 as shown in FIG. 2, or an appropriate distribution of dots 5a.

It is important that such a surface light source device gives an enhanced brightness and also provides a uniform distribution of brightness.

To provide an enhanced brightness in the surface light source device, in one of its known forms as shown in FIG. 4, linear light sources 2 are provided close to each side of the light-conducting member 1.

However, the surface light source device of FIG. 4 with four pieces of light sources has a difficulty in providing a uniform distribution of brightness. It is impossible to obtain a uniform distribution of brightness simply by providing dots, as shown in FIGS. 2 and 3, on the surface 1c of the light-conducting member 1.

Also, in another of its known forms, the conventional surface light source device used with the light-conducting member, as shown in FIG. 5, is such that a light-conducting member 1 has a full thickness in a region close to the light sources 2, but gradually decrease with distance from the light sources 2. However, in such a surface light source device, because each side edge varies in shape and size, it is difficult to increase the number of the light sources. Thus, there is no known device of this type that has been used with four pieces of the light sources, and thus, it is impossible to increase the number of the light sources and thus enhance the brightness in the device.

In still another of its known forms, the conventional surface light source device, as shown in FIG. 6, is such that, to increase the brightness in the device, a pair of linear light sources 2, one above another, is contained in each end surface 1a of the light-conducting member 1. Compared to the brightness in the device having a single light source for each end, however, this surface light source device provides only 1.6–1.8 times as much brightness, thus indicating a low utilization of light emanating from the light sources 2. This is due the linear light sources, such as cold-cathode fluorescent tubes (discharge tubes), dissipating heat for mutual heating and resulting in a lowering of light source performance.

SUMMARY OF THE INVENTION

An object of this invention is to provide a surface light source device having a light-conducting member that produces both an enhanced brightness and a uniform distribution of brightness in the device.

The surface light source device of this invention includes a plate-like light-conducting member of transparent sheet material, one or more light sources disposed close to each end surface of the light-conducting member, a diffusion plate disposed close to the front surface, i.e. light-emitting surface, of the light-conducting member, and a reflection surface disposed on or near the back surface of the light-conducting member. The back surface of the light-conducting member has a pattern of a multiplicity of tiny rough surface areas wherein tiny rough surface areas are appropriately distributed.

In the surface light source device of this invention, light is allowed to fall into each end of the light-conducting member and thus increase the brightness. Also, the back surface of the light-conducting member has a pattern in which a large number of tiny rough surface areas are appropriately distributed to provide a uniform distribution of brightness in the device. For example, in one direction of connecting a pair of two opposed side of the light-conducting member the sum of tiny rough surface areas per unit of area is uniform, while in the direction of connecting another pair of two opposed sides of the light-conducting member, the density of these tiny rough surface areas is small adjacent to each end, but gradually increases toward the center portion and reaches the largest density at the center portion. Thus, a uniform distribution of brightness is obtained when light is incident on all four side edge surfaces of the light-conducting device.

BRIEF DESCRIPTION OF THE DRAWINGS

FIG. 7 is a cross-sectional view; FIG. 8 is a plan view; and FIG. 9 is a view showing a pattern of tiny rough surface areas formed on the back surface of the light-conducting member.

DETAILED DESCRIPTION OF THE PREFERRED EMBODIMENTS

Figure 1:
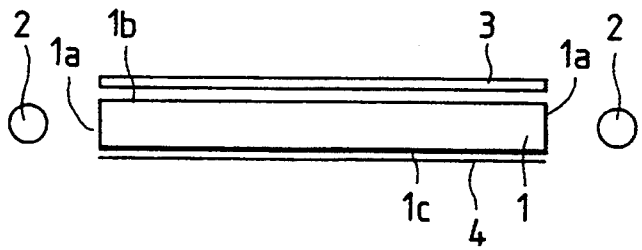
FIG. 1 is a cross-sectional view of the conventional surface light source device having a light-conducting member.
Figure 2:
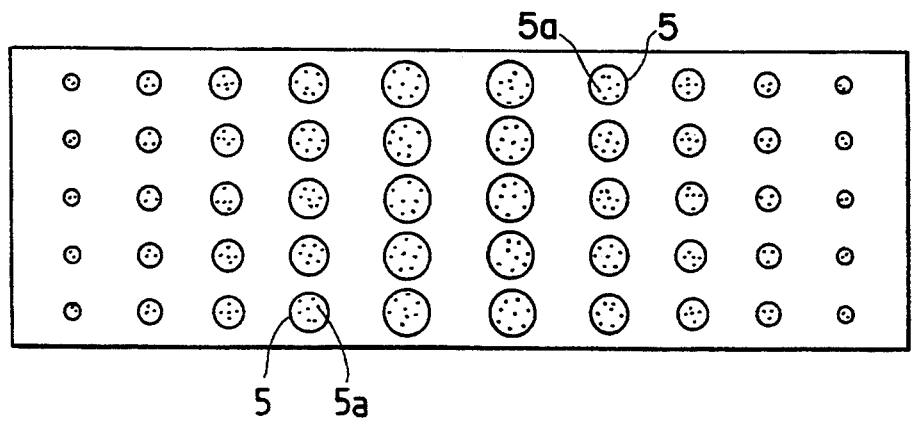
FIG. 2 is a view showing an example of a pattern of tiny rough surface areas that is formed on the back surface of the light-conducting member in the conventional surface light source device.
Figure 3:
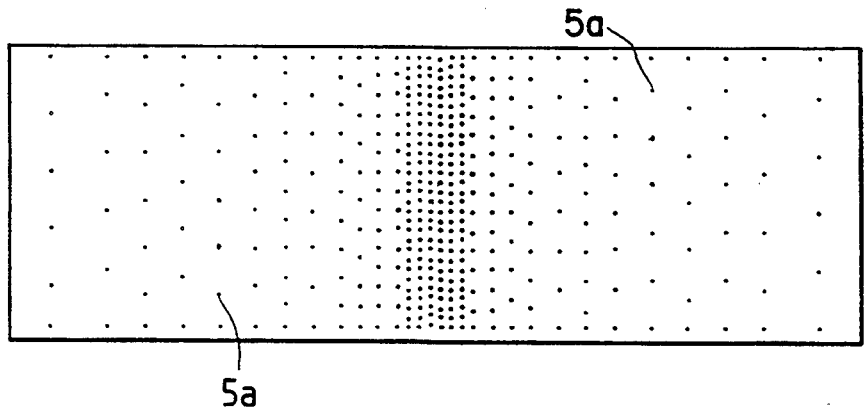
FIG. 3 is a view showing an example of a multiplicity of dots that are formed on the back surface of the conventional light-conducting member.
Figure 4:
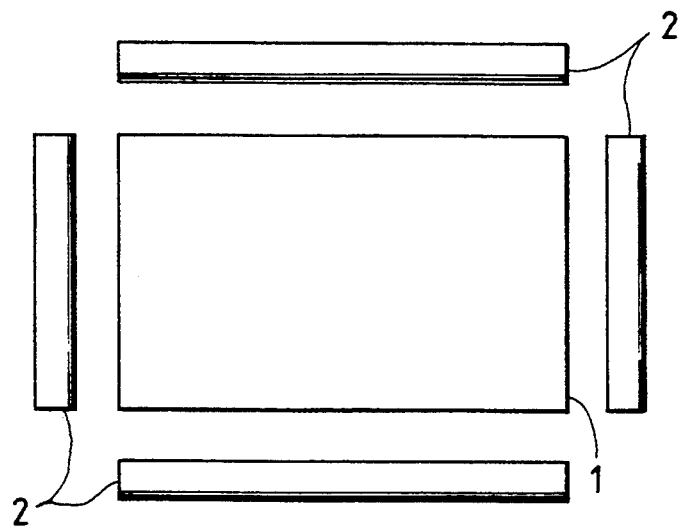
FIG. 4 is a view showing the arrangement of light sources with respect to the light-conducting member in another form of the conventional surface light source device.
Figure 5:
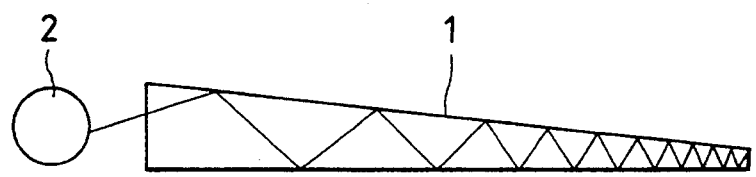
FIG. 5 is a view showing the arrangement of light sources with respect to the light-conducting member having a varying thickness in still another form of the conventional surface light source device.
Figure 6:
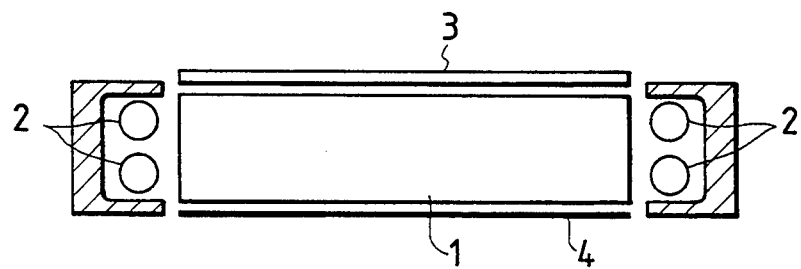
FIG. 6 is a cross-sectional view of another form of a light-conducting member that is used with the conventional surface light source device.
Figure 7:
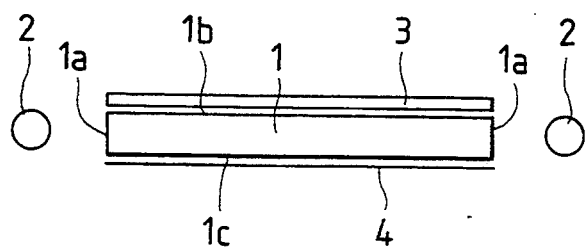
FIGS. 7, 8 and 9 are views of a first embodiment of this invention.
Figure 8:
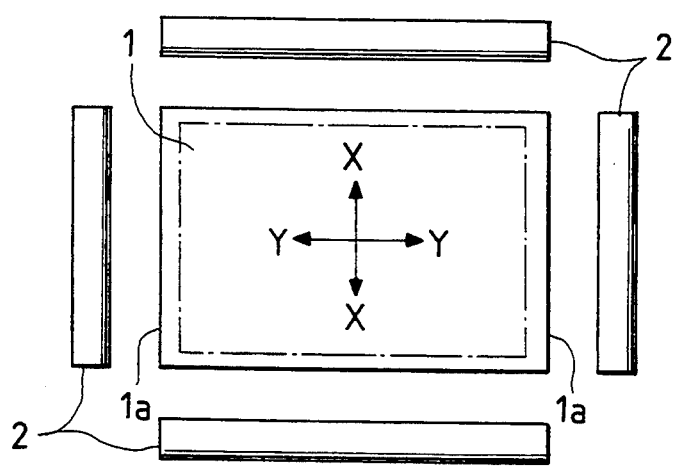
Figure 9:
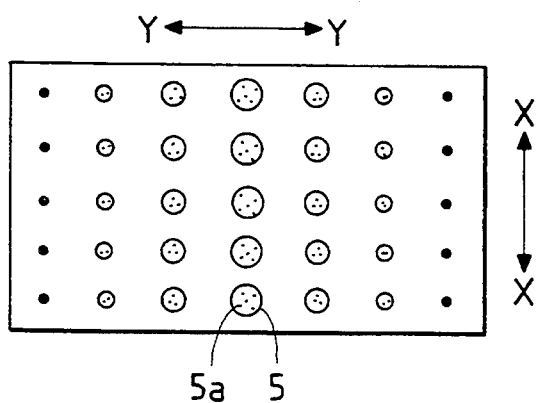

FIG. 7 is a vertical section of a first embodiment of a surface light source device in accordance with this invention. FIG. 8 is a plan view of the device of FIG. 7. The device of FIGS. 7 and 8 includes a light-conducting member 1, four pieces of light sources 2 disposed to surround on all sides of the light-conducting member 1, a diffusion plate 3 disposed near the front surface 1b, i.e. light-emitting surface, of the light-conducting member 1, and a reflection surface 4 disposed on or near the back surface 1c of the light-conducting member 1. Thus, the device shown has substantially the same construction as the conventional surface light source device. In this embodiment, the back surface 1c of the light-conducting member 1, on or near which the reflection surface is disposed, has a pattern of tiny rough surface areas 5 consisting of a multiplicity of dots 5a as shown in FIG. 9. The pattern is formed by printing, etc.

The pattern of tiny rough surface areas 5 as shown in FIG. 9 has a uniform distribution in a longitudinal direction (the x direction in FIG. 8) of the front surface 1b, but in a transverse direction (the y direction in FIG. 8) the tiny rough surface areas 5 per unit of area is largest in the central region and becomes smallest in regions close to both end surfaces.

In this first embodiment, four pieces of linear light sources are used so that light enters the light-conducting member 1 through all of its four end surfaces 1a. Thus, the quantities of light emitted from the surface 1b become large and this provides an enhanced brightness in the surface light source device. Also, by providing the pattern of tiny rough surface areas 5 as shown in FIG. 9, diffuse light emerging through the diffusion plate 3 becomes uniform over the surface of the diffusion plate 3.

Now, let us explain how a uniform distribution of brightness on the diffusion plate 3 can be obtained when the pattern of FIG. 9 is formed on the back surface 1c of the light-conducting member.

Figure 10A:
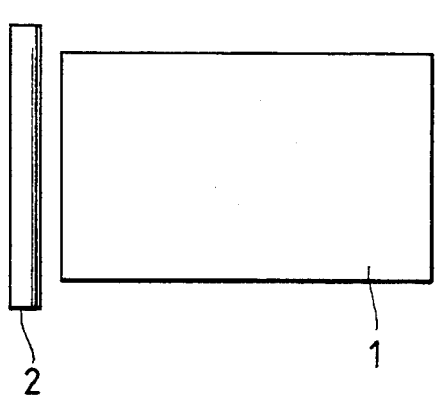
FIGS. 10A, 10B, 10C, 11A and 11B are schematic diagrams to help explain the distribution of brightness on the front surface of the light-conducting member in accordance with the first embodiment.
Figure 10B:
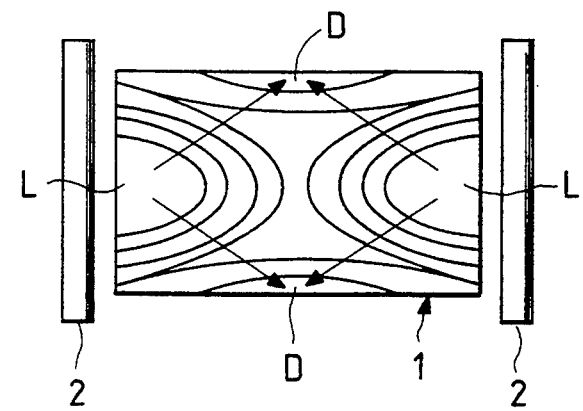
Figure 10C:
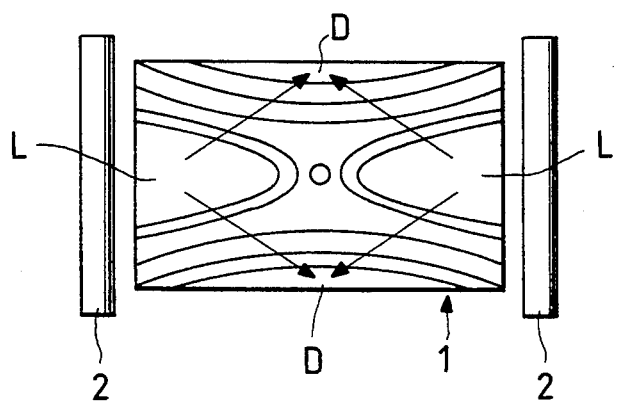

FIG. 10A is a view of the surface light sources device in which a pair of light sources are disposed along two opposed end surface of the light-conducting member 1, showing the arrangement of the light-conducting member 1 and the light source 2. FIG. 10B is a diagram of the conventional light-conducting member 1, showing the distribution of brightness, in equality of brightness lines, on the light-emitting surface 1b of the light-conducting member 1. It is seen that the region marked "L" is the brightest and the region "D" is the darkest, and thus the brightness is unevenly distributed. FIG. 10C shows the distribution of brightness in the surface light source device of this invention where the pattern of tiny rough surface areas 5, as shown in FIG. 9, is formed on the back surface 1c of the light-conducting member 1. It will be seen from FIG. 10C that the distribution of brightness is made so uniform that the difference in brightness between surrounding and central regions is significantly reduced.

Figure 11A:
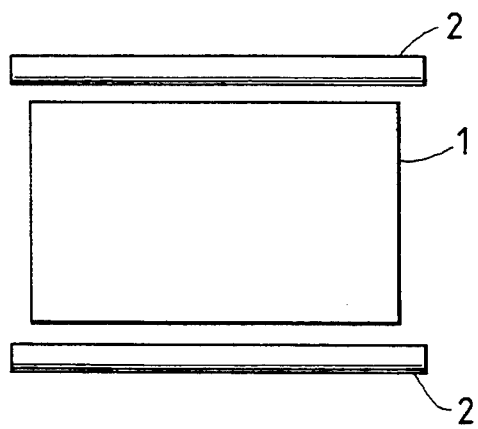
Figure 11B:
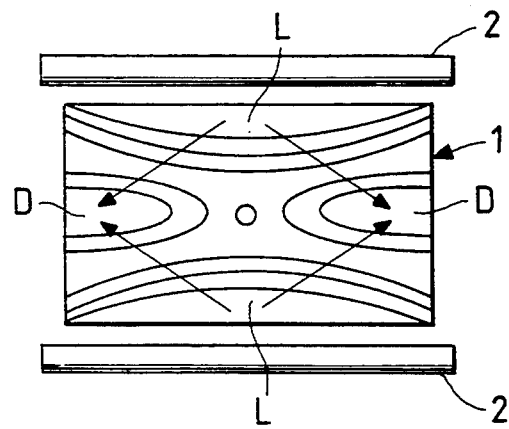

FIG. 11A is a view of another mode of the device in which a pair of light sources are disposed along two opposed end surfaces of the light-conducting member 1, whose end surfaces extend transversely to those in FIG. 10A. More particularly, FIG. 10A shows the light sources arranged along two opposed end surfaces lying right and left in the drawing. By contrast, FIG. 11A shows the light sources arranged along two opposed end surfaces lying vertically in the drawing. FIG. 11B shows the distribution of brightness the surface light source device of FIG. 11A. In this case, the upper and lower regions are brighter, while the right and left regions are darker.

In this first embodiment, as shown in FIG. 8, four pieces of light sources are disposed along all four end surfaces 1a of the light-conducting member 1. Thus, the distribution of brightness on the light-emitting surface 1b of the light-conducting device 1 is a combination of the ones shown in FIGS. 10C and 11B. More particularly, the bright region of FIG. 10C and the dark region of FIG. 11B are combined. Also, the dark region of FIG. 10C with the bright region of FIG. 11B, as well as medium brightness regions in FIGS. 10C and 11B are combined. Thus, a substantially uniform distribution of brightness is obtained over the entire surface 1b.

The length of each light source used in this first embodiment may preferably be slightly longer, up to 15 mm, than the size of a luminous surface. In this case, the luminous surface is enclosed by a chain line in FIG. 8.

The size of the luminous surface, where, for example, the length of an end surface is t and the length of a light source is t', should preferably be given by an equation of $t = t' + \alpha$. In this case, the $\alpha$ range is $0 < \alpha < 15$ mm.

Figure 12A:
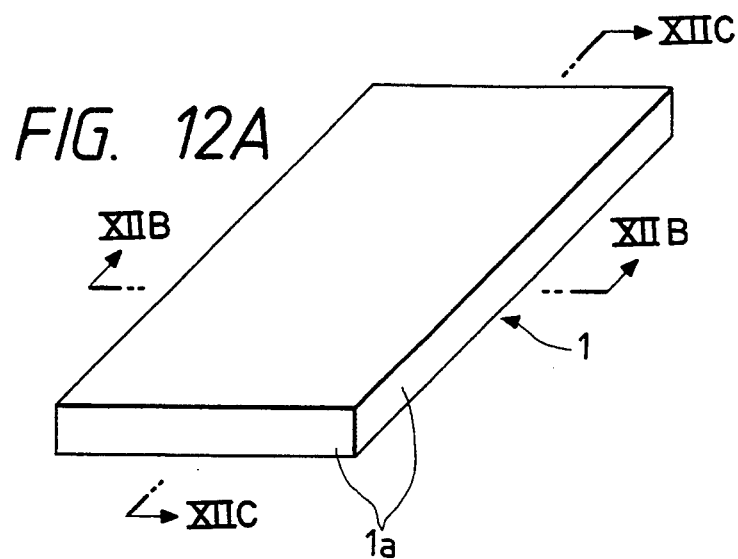
FIGS. 12A, 12B and 12C are views of a second embodiment of this invention.
Figure 12B:
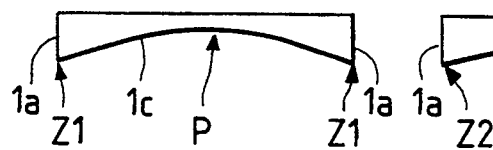
Figure 12C:
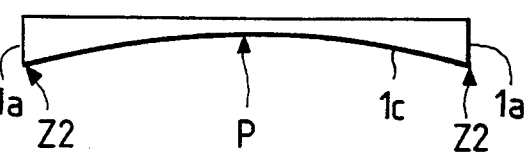

FIGS. 12A, 12B and 12C are views of a second embodiment of this invention: FIG. 12A is a perspective view of the light-conducting member 1; FIGS. 12B and 12C are cross-sectional views taken on lines XIIB—XIIB and XIIC—XIIC of FIG. 12A, respectively. This embodiment also has linear light sources (not shown) disposed along all four end surfaces 1a of the light-conducting member. As shown in FIGS. 12B and 12C, the light-conducting member 1 of this embodiment has a back surface 1c having the concave face in which the region "P" is the thinnest while the regions "Z1" and "Z2" are the thickest. Also, the surface 1c has either a uniform distribution of dots or a uniform distribution of tiny rough surface area formed thereon.

In this embodiment, light entering all four end surfaces 1a of the light-conducting member 1 undergoes total internal reflection at the surfaces 1b, 1c. As it is being transmitted, the light is uniformly diffused at the rough surfaces. However, because the surface 1c is concave, the light reflection varies depending on different positions of the surface 1c and thus light emissions become uniform throughout the surface 1b.

In this embodiment, by providing an appropriate pattern of tiny rough surface areas on the surface 1c of the light-conducting member 1, the light emissions can be made more uniform.

Figure 13A:
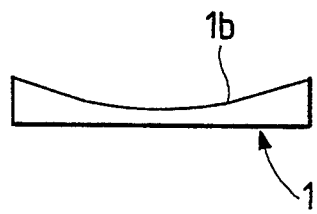
FIGS. 13A and 13B are views of variants of the second embodiment of this invention.
Figure 13B:
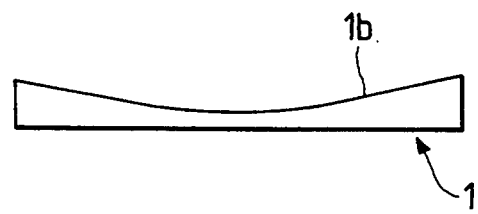

FIGS. 13A and 13B are views of variants of the second embodiment wherein the front surface 1b of the light-conducting member 1 has the concave face. In this case, the plane back surface 1c has a pattern of dots or tiny rough surface areas.

Figure 14:
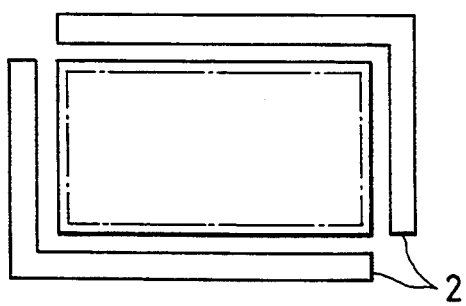
FIGS. 14 and 15 are views showing the arrangement of differently shaped light sources.
Figure 15:
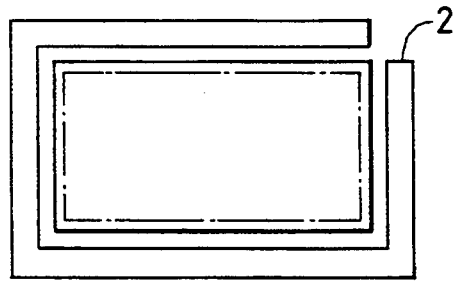

In the first and second embodiments noted above, four pieces of light sources are used. However, as shown in FIG. 14, a pair of L-shaped light sources may be used. Alternatively, a one-piece light source as shown in FIG. 15 may be used.

Cold-cathode fluorescent tubes are normally used to serve because a light source. However, as a cold-cathode fluorescent tube does not emit light at the electrode, the quantity of light generated is smaller or uneven near the electrode when compared to the remainder. Thus, the quantity of light entering the end near the light source's electrode becomes smaller or uneven than elsewhere. Particularly, an uneven quantity of light is of great concern.

Figure 16:
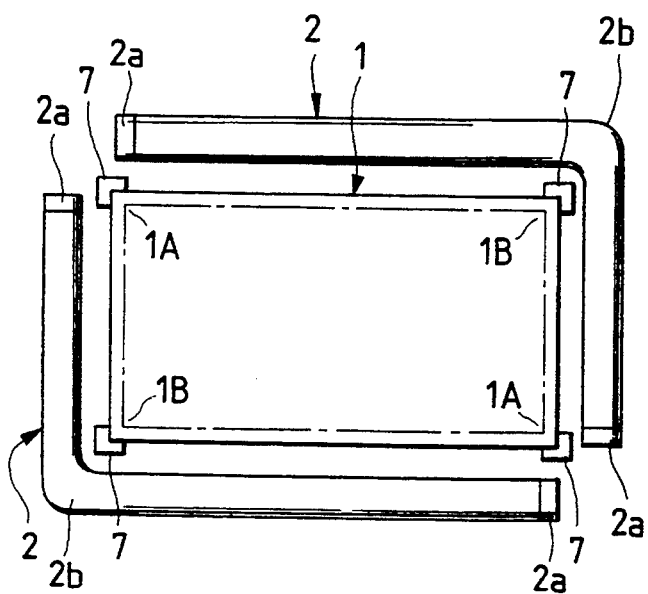
FIGS. 16, 17 and 18 are views of a third embodiment of this invention.

FIG. 16 is a view of a third embodiment that overcomes the disadvantage noted above.

In this third embodiment, shield members 7 are provided on the light-conducting member 1 in places near the electrodes 2a of the light source 2 to ensure that light emanating from near the electrodes 2a will not enter the light-conducting member 1. Thus, the light-emitting surface of the light-conducting member 1, so long as it lies within the limits shown by a chain line in the drawing, is kept free from the effects due to uneven quantity of light emanating from the electrodes 2a of the light source 2. However, when L-shaped light sources are used as shown in FIG. 16, variations in the quantity of light are likely to occur at bends 2b of cold-cathode fluorescent tubes. Further, when shield members 7 are provided adjacent to the electrodes 2a, the quantity of light incident on regions "1A" of the light-conducting member 1 near the electrodes 2a differs from that on regions "1B" near the bends 2b. Thus, shield members 7 must be provided in regions "1B" as well as in regions "IA".

Thus, this third embodiment provides a surface light source device of more uniform brightness wherein shield members 7 are provided in regions "1A" and "1B", respectively, so as to keep the light-conducting member unaffected from the uneven quantity of the light emanating from the electrodes 2a and the bends 2b.

Figure 17:
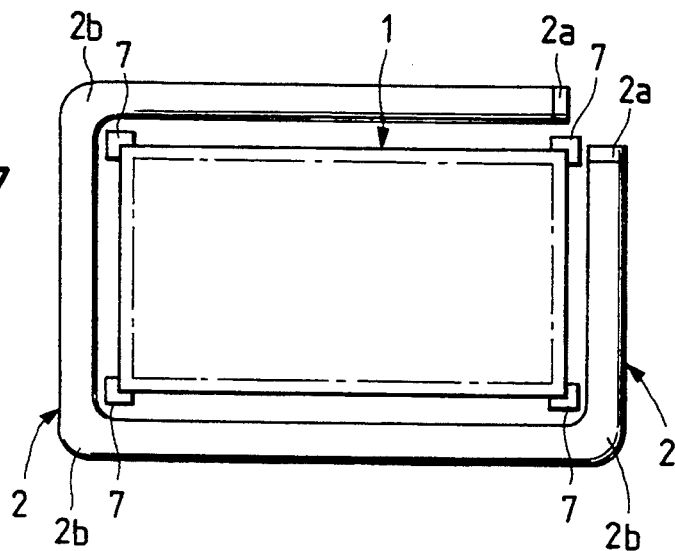

FIG. 17 is a view of a variant of the third embodiment. In this variant, instead of a L-shaped light source previously described, a one-piece light source is provided to surround substantially all four sides of a rectangle. The variant of FIG. 17 also has a shield member 7 provided on each corner of the light-conducting member 1 so as to avoid the effects from the electrodes 2a and the bends 2b of the light source 2.

Figure 18:
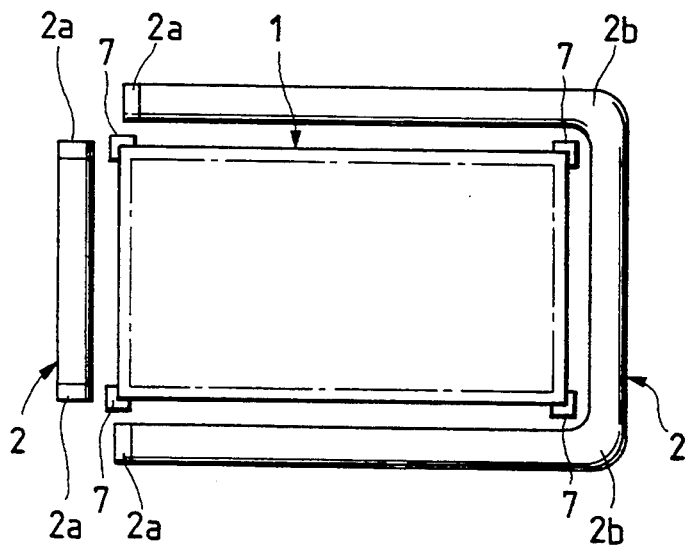

FIG. 18 is another variant of the third embodiment. In this variant, a combination of an U-shaped light source with a linear light source is used so that the light source 2 is provided along all four side edges of the light-conducting member 1. In accordance with this variant, the light-conducting member 1 also has shield members 7 at respective positions close to the electrodes 2a and the bends 2b of the light source 2.

In accordance with the embodiments of FIGS. 16, 17 and 18, the shield members 7 used may be formed of a black tape or a metallic coating, etc. More particularly, a black tape may be applied, or a metallic coating deposited, on corners of the light-conducting member 1.

Figure 19:
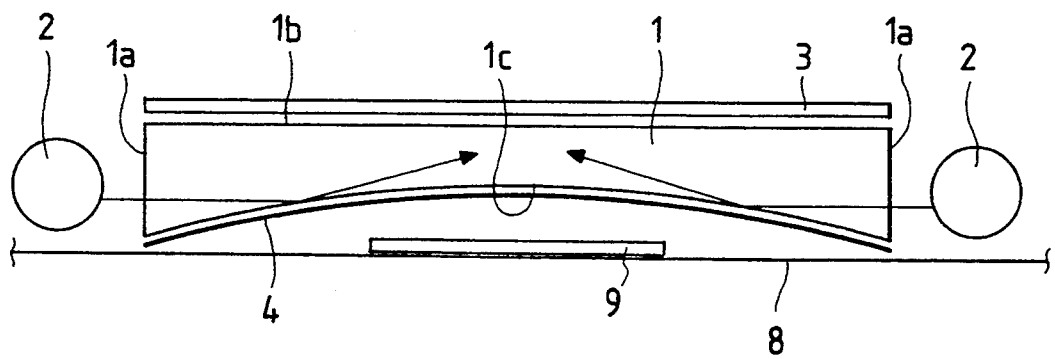
FIG. 19 is a view of a fourth embodiment of this invention.

FIG. 19 is a view of a fourth embodiment of this invention. In this embodiment, the light-conducting member 1 has a back surface 1c having the concave face as shown in FIGS. 12B and 12C, etc. A component 9 of the light-source lighting system is provided in a space between the concave face and a case surface 8, thus resulting in a smaller-sized surface light source device. Also, when the surface light source device is used as a back light of a liquid crystal display, a liquid crystal driving circuit 9 can be provided in a space between the concave face 1c and a case surface 8.

Further, if the reflection surface 4 on the back surface 1c of the light-conducting member 1 is formed of metal foils such as aluminium ones, and such metal foils are earthed, the earthed metal foils provide a shield from the driving circuit to prevent the malfunction of the circuit.

Still further, to increase the brightness on the surface light source device, in a variant of this fourth embodiment, a pair of light sources may be provided in the vertically upward and downward positions as previously described. However, this decreases the utilization efficiency of the light source.

Figure 20:
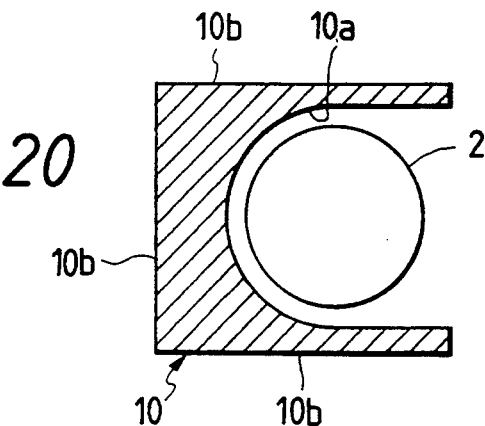
FIG. 20 is a view showing a lamp housing that is used with a fifth embodiment of this invention.

FIG. 20 is a cross-sectional view of a discharge tube holder for use with a fifth embodiment to be described below. This holder is used to increase the utilization efficiency of light emanating from the light source. The lamp holder 10 includes an inner face 10a forming a reflection surface, an outer face 10b having rough surface, and a light source 2 arranged as shown.

Figure 21:
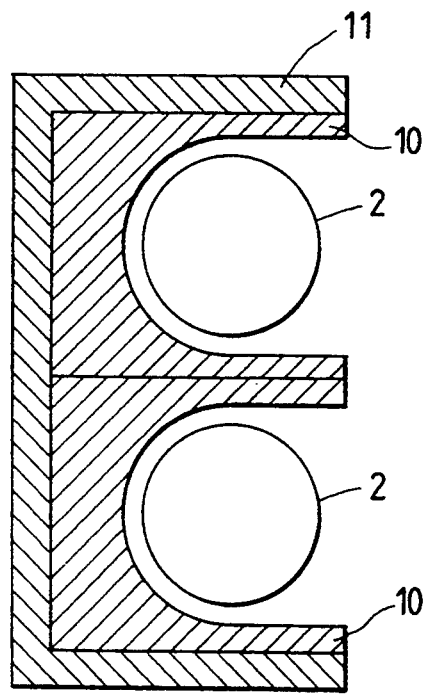
FIG. 21 is a fragmentary cross-sectional view showing a light source and adjacent regions only in accordance with the fifth embodiment of this invention.

FIG. 21 is a view of a fifth embodiment of this invention, showing the light source and adjacent regions. A pair of lamp holders 10, which are placed vertically in a case 11, receive a pair of linear light sources 2. Because the lamp holders 10 have a rough surface on their outer faces, an airspace is provided in a joint between the two lamp holders to reduce the transmission of heat from the discharge lamps. Thus, it is possible to prevent a reduction in the light utilization efficiency due to the heat.

Figure 22:
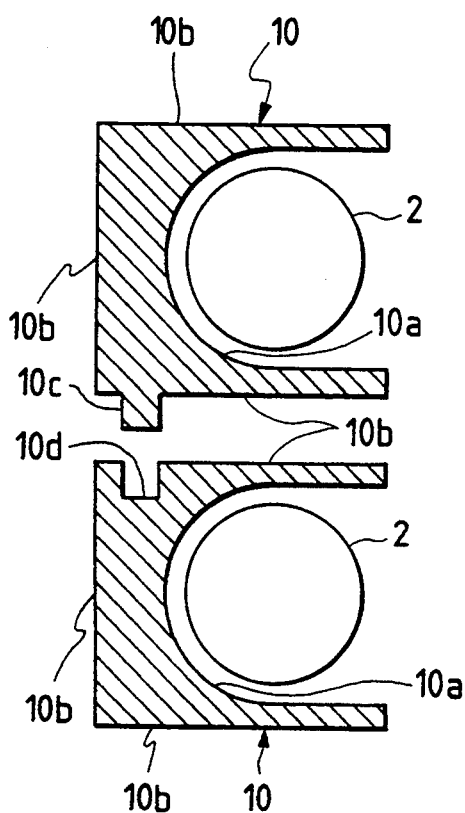
FIG. 22 is a cross-sectional view of a variant of the fifth embodiment of this invention, showing a light source and adjacent regions.

FIG. 22 is a cross-sectional view of a pair of lamp holders forming a variant of the fifth embodiment. Each of the lamp holders 10 includes opposed outer faces provided with a projection 10c and a slot 10d. By coupling a projection 10c with a slot 10d, a pair of lamp holders 10 are connected together. The outer faces of these lamp holders 10 have a rough surface similar to FIG. 21, except a projection 10c and a slot 10d. Thus, as in the lamp holder of FIG. 21, an air space is provided in a joint between two lamp housings to provide heat insulation.

Figure 23:
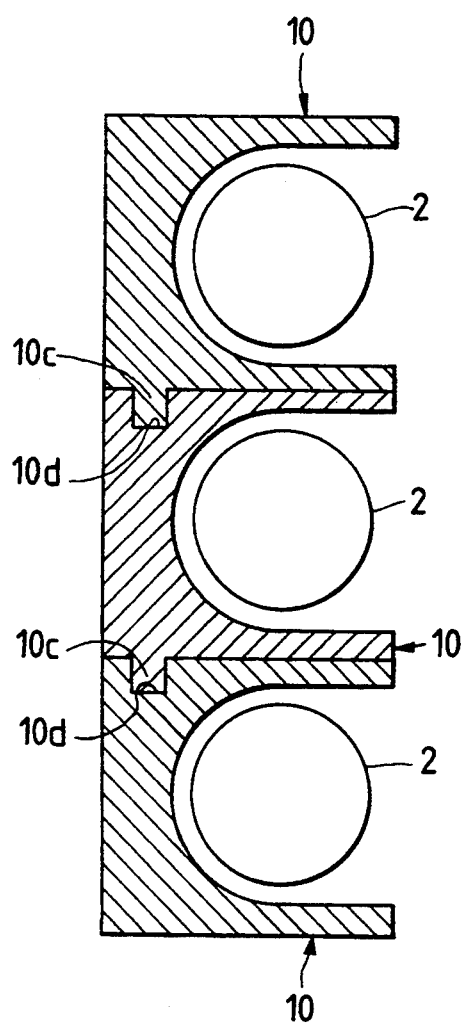
FIG. 23 is a cross-sectional view showing three pieces of light sources when used with the variant of FIG. 22.

FIG. 23 is a view of three pieces of lamp housings 10 connected together.

Figure 24:
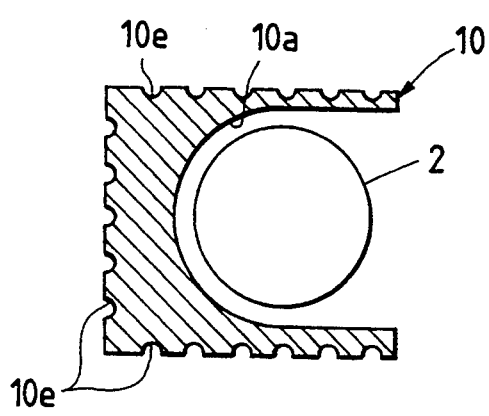
FIGS. 24 and 25 are views of other variants of the fifth embodiment.
Figure 25:
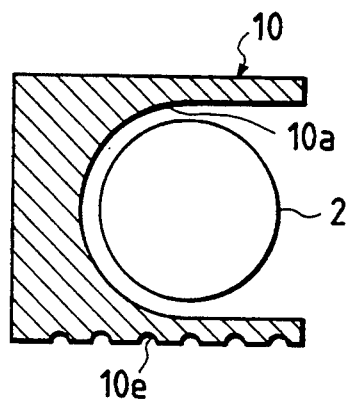

FIGS. 24 and 25 are cross-sectional views of different variants of the fifth embodiment, showing different types of lamp housings. The lamp housings 5 shown has a multiplicity of depressions 10e formed on its outer face. These depressions 10e provide an air space for heat insulation.

To improve heat insulation, the lamp houses 10 of FIGS. 20, 22, 24 and 25 may be formed of either heat insulating material or heat-radiating material.

As explained above, each of the embodiments of this invention has at least one light source provided along each side edge of a light-conducting member, thus increasing the brightness on the surface light source and providing a uniform distribution of brightness.

We claim:

1. A surface light source device comprising:
   a light-conducting member consisting of rectangular transparent sheet material;
   a plurality of linear light sources provided along all four side edges of said light-conducting member;
   a diffusion plate provided adjacent to a front surface of said light-conducting member; and
   a reflection surface provided adjacent a back surface of said light-conducting member, said back surface of said light-conducting member having a pattern consisting of a plurality of tiny rough surface areas, wherein said pattern has a uniform sum of area for said tiny rough surface areas per unit area in a direction of a pair of opposed sides of said light-conducting member, while as viewed in a direction of a second pair of opposed sides of said light-conducting member, said pattern having a largest density of said rough surface areas in a center portion of said pattern, but gradually decreasing toward said second pair of opposed sides and reaching a smallest density on said two opposed sides.

2. A surface light source device comprising:
   a light-conducting member consisting of rectangular transparent sheet material;
   a plurality of linear light sources provided along all four side edges of said light-conducting member;
   a diffusion plate provided adjacent to a front surface of said light-conducting member; and
   a reflection surface provided adjacent a back surface of said light conducting member, said light-conducting member having a curved surface so that said light-conducting member has a thickness at a center portion thereof which is less than a thickness at all four side edges of said light-conducting member, and said back surface having a rough surface.

3. A surface light source device according to claim 2, wherein said light-conducting member has a flat front surface and a concave back surface.

4. A surface light source device according to claim 3, wherein said concave face of said light-conducting member contains a light source lighting component.

5. A surface light source device according to claim 2, wherein said light-conducting member has a concave front surface and a flat back surface.

6. A surface light source device according to any of claims 1 to 5, wherein said plurality of linear light sources include a one-piece light source surrounding all four side edges of said light-conducting member.

7. A surface light source device according to claim 6, wherein said light-conducting member has a shield member on each corner thereof.

8. A surface light source device according to any one of claims 1 and 2, wherein a pair of said plurality of linear light sources are provided along each side edge of said light-conducting member and wherein said pair of said plurality of linear light sources are contained in a pair of lamphouses having rough surfaces formed on outer faces thereof and are connected together.

9. A surface light source device according to any one of claims 1 and 2, wherein a pair of said plurality of linear light sources are provided along each side edge of said light-conducting member and wherein said pair of said plurality of linear light sources are contained in a pair of lamphouses having a multiplicity of depressions formed on outer faces thereof and are connected together.

10. A surface light source device comprising:
    a light-conducting member consisting of rectangular transparent sheet material;
    a plurality of linear light sources provided along all four side edges of said light-conducting member;
    a diffusion plate provided adjacent to a front surface of said light-conducting member; and
    a reflection surface provided adjacent a back surface of said light-conducting member, said back surface of said light-conducting member having a pattern consisting of a plurality of tiny rough surface areas, wherein said pattern has a uniform sum of area for said tiny rough surface areas per unit area in a direction of a pair of opposed sides of said light-conducting member while as viewed in a direction of a second pair of opposed sides of said light-conducting member, said pattern having a largest density of said rough surface areas in a center portion of said pattern, but gradually decreasing toward said second pair of opposed sides and reaching a smallest density on said two opposed sides;
    wherein said plurality of light sources include a pair of L-shaped light sources.

11. A surface light source device according to claim 10, wherein said light-conducting member has a shield member on each corner thereof.

12. A surface light source device comprising:
    a light-conducting member consisting of rectangular transparent sheet material;
    a plurality of linear light sources provided along all four side edges of said light-conducting member;
    a diffusion plate provided adjacent to a front surface of said light-conducting member; and
    a reflection surface provided adjacent a back surface of said light conducting member, said light-conducting member having a curved surface so that said light-conducting member has a thickness at a center portion thereof which is less than a thickness at two opposed ends, and said back surface having a rough surface;
    wherein said plurality of linear light sources include a pair of L-shaped light sources.

13. A surface light source device according to claim 12, wherein said light-conducting member has a shield member on each corner thereof.

14. A surface light source device comprising:

a light-conducting member including a rectangular transparent sheet material and having a front surface and back surface and four peripheral edges;

a light source disposed adjacent to said four peripheral edges;

a diffusion plate disposed adjacent to said front surface;

a reflection plate disposed adjacent to said back surface;

wherein said back surface includes a roughened pattern formed thereon, said roughened pattern including a plurality of dots, said dots being of constant size between a first two opposed of said peripheral edges, and said dots decreasing in size from a center portion of said back surface towards a second two opposed of said peripheral edges.

15. A surface light source device comprising:

a light-conducting member including a rectangular transparent sheet material and having a front surface and back surface and four peripheral edges;

a light source disposed adjacent to said four peripheral edges;

a diffusion plate disposed adjacent to said front surface;

a reflection plate disposed adjacent to said back surface;

wherein said back surface includes a roughened pattern formed thereon, said roughened pattern including a plurality of dots, said dots being of constant size between a first two opposed of said peripheral edges, and said dots decreasing in size from a center portion of said back surface towards a second two opposed of said peripheral edges; and wherein said light-conducting member includes four corners, each having a shield member connected thereto.

16. A surface light source device comprising:

a light-conducting member including a rectangular transparent sheet material and having a front surface and back surface and four peripheral edges;

a light source disposed adjacent to said four peripheral edges;

a diffusion plate disposed adjacent to said front surface;

a reflection plate disposed adjacent to said back surface;

wherein said back surface includes a roughened pattern formed thereon, said roughened pattern including a plurality of dots, said dots being of constant size between a first two opposed of said peripheral edges, and said dots decreasing in size from a center portion of said back surface towards a second two opposed of said peripheral edges; and wherein said light-conducting member has a thickness that is greater at said four peripheral edges than at said center portion.

17. A surface light source device according to claim 16, wherein said back surface is concave.

18. A surface light source device according to claim 16, wherein said front surface is concave.

19. A surface light source device comprising:

a light-conducting member including a rectangular transparent sheet material and having a front surface and back surface and four peripheral edges;

a light source disposed adjacent to said four peripheral edges;

a diffusion plate disposed adjacent to said front surface;

a reflection plate disposed adjacent to said back surface;

wherein said back surface includes a roughened pattern formed thereon, said roughened pattern including a plurality of dots, said dots being of constant size between a first two opposed of said peripheral edges, and said dots decreasing in size from a center portion of said back surface towards a second two opposed of said peripheral edges; and wherein said light source includes at least one linear light source, said linear light source being housed within a housing having a roughened outer surface.

* * * * *